US00RE38291E

(19) United States
(12) Reissued Patent
Kennedy et al.

(10) Patent Number: US RE38,291 E
(45) Date of Reissued Patent: Oct. 28, 2003

(54) PLUNGER DEVICE AND METHOD OF MAKING AND USING THE SAME THEREOF

(76) Inventors: Craig A. Kennedy, 14132 W. Greentree Dr., Litchfield Park, AZ (US) 85340; Daniel L. Poole, 11016 N. Biltmore Dr. #1216, Phoenix, AZ (US) 85029

(21) Appl. No.: 09/917,034

(22) Filed: Jul. 27, 2001

Related U.S. Patent Documents

Reissue of:
(64) Patent No.: 5,927,957
Issued: Jul. 27, 1999
Appl. No.: 08/876,748
Filed: Jun. 16, 1997

U.S. Applications:
(60) Provisional application No. 60/020,075, filed on Jun. 19, 1996.

(51) Int. Cl.[7] ..... F04B 7/00; E03D 9/00
(52) U.S. Cl. ..... 417/511; 417/514; 417/550; 417/555.1; 4/255.02
(58) Field of Search ..... 417/53, 511, 514, 417/545, 550, 555.1; 92/181 P; 4/255.02, 255.03

(56) References Cited

U.S. PATENT DOCUMENTS

| | | | | | |
|---|---|---|---|---|---|
| 1,379,492 | A | * | 5/1921 | Wagner | 417/511 |
| 1,405,907 | A | * | 2/1922 | Edwards | 417/514 |
| 1,455,584 | A | * | 5/1923 | Graham | 417/511 |
| 1,495,303 | A | * | 5/1924 | Heidelberg | 4/255.03 |
| 1,745,923 | A | * | 2/1930 | Frizzell | 4/255.03 |
| 1,918,048 | A | * | 7/1933 | Marxman | 4/255.02 |
| 2,044,594 | A | * | 6/1936 | Scholfield | 4/255.03 |
| 2,187,043 | A | * | 1/1940 | MacMillian | 4/255.02 |
| 2,697,842 | A | * | 12/1954 | Meyer | 4/255.02 |
| 4,674,658 | A | * | 6/1987 | Van Brocklin | 137/576 |
| 4,847,923 | A | * | 7/1989 | Huang | 4/255.03 |
| 5,156,538 | A | * | 10/1992 | Lee | |
| 6,035,455 | A | * | 3/2000 | Rankovic | 4/255.03 |

OTHER PUBLICATIONS

Super Plunger Advertisement One page ad sponsored by Handsome Rewards, CA (No date).*

* cited by examiner

*Primary Examiner*—Cheryl J. Tyler
(74) *Attorney, Agent, or Firm*—Dorsey & Whitney LLP

(57) ABSTRACT

[New] *A* plunger having a cylindrical hollow body [20 or 20B], a handle [30, 30A, or 30B], an outlet hose [40], an outlet tip [42], and a valve [or flap 50, 60, or 70] *structure* that [is able to] controls the air flow within the hollow [25] *portion* of the cylindrical body [20 or 20B] *is shown. The* valve [or flap 50, 60, or 70] *structure* is moved into a closed position so that air is forced out of the front of the plunger and towards a clogged or stopped area [82 or 92] and is moved into an open position so that air enters the back of the plunger and [passes] *proceeds past the* valve [or flap 50, 60, or 70] *structure,* so that water and/or clogging material is not drawn or sucked into the interior of the plunger. [F] *The hose attached to the cylindrical body is flexible and is smaller in diameter than the drain throat of a plumbing fixture allowing the hose to be placed into a clogged area. A* first embodiment plunger [10 discloses] *shows* a flexible valve flap [50] that compresses against the inner wall of the cylindrical body [20] when in a closed position and flexes outwardly and away from piston plate [38] when in an open position. [S] *A* second embodiment plunger [discloses] *shows* a circular valve plate [60] that slidingly fits within inner portion of piston plate [38 wherein] *such that the* valve plate [60] is coupled to and controlled by handle control mechanism [64]. [H] *The* handle control mechanism [64] controls and places *the* valve plate [60] in *either* a closed position or an open position. [T] *A* third embodiment plunger [discloses] *shows a* handle [30B] having piston plate [38 with] *that* rotatingly engag[ing]*es a first set of* tab portions [37] and [a] flexible valve flaps [70] with perforated by-pass holes [74 and slidingly engaging] *that engage a second set of* tab portions [72].

17 Claims, 7 Drawing Sheets

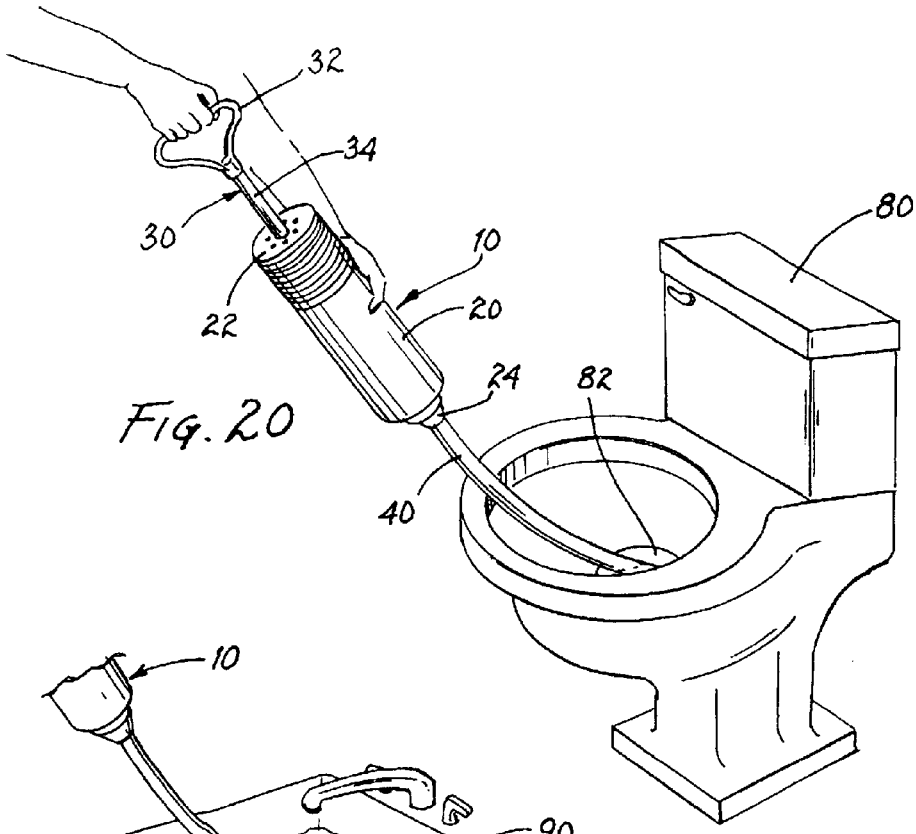
FIG. 20
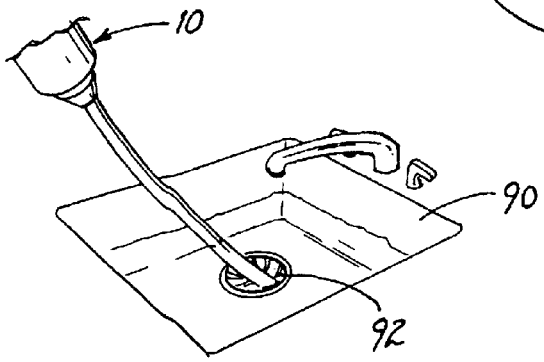
FIG. 20A
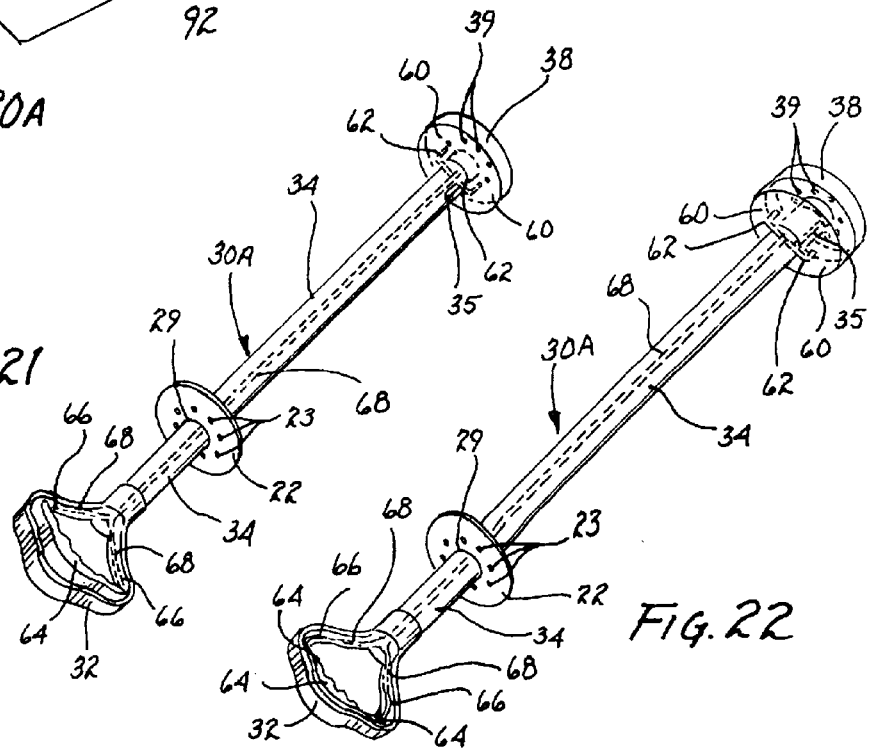
FIG. 21
FIG. 22

PLUNGER DEVICE AND METHOD OF MAKING AND USING THE SAME THEREOF

Matter enclosed in heavy brackets [ ] appears in the original patent but forms no part of this reissue specification; matter printed in italics indicates the additions made by reissue.

*CROSS REFERENCE TO RELATED APPLICATIONS*

[This Non-Provisional Application claims the benefit of U.S. Provisional Application Ser. No. 60/020,075 filed on Jun. 19, 1996.]*This application is a reissue of application Ser. No. 08/876,748, filed on Jun. 16, 1997, now U.S. Pat. No. 5,927,957, which application claims the benefit of U.S. provisional application No. 60/020,075, filed on Jun. 19, 1996.*

BACKGROUND OF THE INVENTION

1. Fields of Invention

The present invention relates to a plunger device, and, more particularly, relates to a new plunger device that is generally used for cleaning out clogged drains or pipes and methods of making and using the new plunger device.

2. Discussion of Background and Prior Art

A conventional plunger is typically a device comprising a rubber or resilient suction cup that is attached to the end of a stick and is used to clean out stopped or clogged drains or pipes. The conventional plunger is utilized by placing the suction cup over the stopped or clogged area which is generally over the drain or pipe opening, and the plunger is moved up and down causing the suction cup to create a suction force over the stopped or clogged area. The suction force is able to draw or suck the debris, material, particles, feces, etc. (hereafter generically referred to as "clogging material") that is/are causing the stop or clog from the stopped or clogged area. After the stop or clog is cleared, the drain or pipe is then able to be used in its normal manner.

The conventional plunger, however, presents many problems. One problem with the conventional plunger is that it draws or sucks the clogging material from the stopped or clogged area which can be very messy for the person having to clear the stop or clog. The plunger can be very messy since the clogging material is being directed from the clogged or stopped area and towards the person performing the plunging function. The moving of the plunger up and down in the water and clogged area may cause splashing of the water and corresponding clogging material (i.e. splashing of particles, debris, feces, etc.) onto the person that is using the plunger. If the amount of clogging material is excessive, then the person may have to manually remove and separately dispose of the clogging material (i.e. manually remove the particles, debris, feces, etc. from the drain or pipe of a toilet or sink).

Another problem is that the suction cup may not fit well or fit entirely over the clogged drain or pipe. This problem is especially true for toilets where the drain area is typically too large for a conventional size plunger. In these situations, the proper amount of suction force may not be created by the suction cup to clear the clog or stop from the drain or pipe area. A further problem exists in that the clogging material is drawn or sucked from the stopped or clogged area, and if the clogging material is not physically and separately removed (i.e. manually, etc.) from the drain or pipe area, then the clogging material again flows back into the drain or pipe area which can result in the drain or pipe not being cleared or the drain or pipe being stopped or clogged again.

Another prior art plunger that has been disclosed is one that has a cylindrical hollow body, a slidable handle, and a circular plate that has approximately the same diameter as the cylindrical hollow body and is attached at one end of the handle, such as the plunger disclosed or marketed by HANDSOME REWARDS, 19465 Brennan Ave., Perris, Calif. 92599 (i.e. "ABFLUSSREINIGER SUPER PLUNGER") or the plunger disclosed in U.S. Pat. No. 5,156,538 to Lee. The handle and the circular plate slides within the hollow of the cylindrical body. A suction cup is attached at one end of the cylindrical body. The handle is pulled out and in an extended position from the cylindrical body. The suction cup of the plunger is then inserted and placed over the clogged area. The handle and attached circular plate is then slidingly moved within the hollow of the cylindrical body and pushed towards the suction cup end of the cylindrical body forcing air or water generally towards and through the clog or stop. However, the main problems with this plunger is that its pumping or plunging action can be very messy (i.e. causing splashing onto the user, etc.), and, in order to be able to re-use the plunger in one method of use, the entire plunger must be removed from the clogged or stopped area before the handle can be pulled out and re-extended from the cylindrical body. The plunger is then able to be used again to force more air or water towards the clog or stop. Otherwise, if the handle is pulled or extended from the cylindrical body when the plunger is still inserted over the clogged area, then the circular plate and moving handle create a suction force in which water and/or clogging material from the clog or stop will be drawn or sucked into the hollow of the cylindrical body resulting in the plunger not working and creating a mess for the user.

Caustic (i.e. corroding, dissolving, burning, etc.) chemicals have been known and used to clear clogs from drains or pipes. However, due to the nature of these chemicals, these caustic chemicals present potential hazards, harms, or dangers to persons that are exposed to them or that accidentally ingest or come into contact with them (i.e. especially internal contact), and some caustic chemicals can corrode or harm the drains or pipes to which they are poured and come into contact. These caustic chemicals also present potential environmental problems, especially those issues relating to their disposal into the environment.

Otherwise, if the clogged or stopped area persists and cannot be cleared, then a professional plumber must be contracted to clear the clogged or stopped area, and the contracting of a professional plumber can be very expensive.

Therefore, a new plunger invention and corresponding methods of manufacture and use that would allow quick, easy, clean, cost-effective, environmentally safe, and readily repeatable air forcing or clearing action towards a clogged or stopped area is needed and desired, and it is an object of the present invention to overcome the problems and limitations of the prior art that has been discussed.

SUMMARY OF THE INVENTION

Set forth is a brief summary of the invention in order to solve the foregoing problems and achieve the foregoing and other objects, benefits, and advantages in accordance with the purposes of the present invention as embodied and broadly described herein.

Accordingly, it is an object and advantage of the present invention to provide a new plunger having a cylindrical hollow body, a handle, an outlet hose, an outlet tip, and a valve or flap mechanism that is able to control the air flow within the hollow of the cylindrical body so that the user can readily push and pull the handle of the plunger.

It is one aspect and advantage of the present invention to provide a valve or flap mechanism that can be moved into a closed position so that air can be forced out of the front of the plunger and towards a clogged or stopped area and can also be moved into an open position so that air is allowed to flow in through the back end of the plunger and water and/or clogging material is not drawn or sucked into the interior of the plunger.

It is a further aspect and advantage of the present invention to provide a handle of the plunger having a piston plate attached to one of its ends and a flexible valve flap attached to the piston plate wherein the flap compresses against the inner walls of the cylindrical body and is automatically forced in a closed position against the piston plate covering and sealing perforated by-pass holes in the piston plate so that air is compressed and forced out of the plunger when the handle is pushed into the plunger and wherein the flap flexes outwardly and away from the piston plate and is forced into an open position in which the perforated by-pass holes of the piston plate are in an open position to allow air to flow through them so that air flows in through the back end of the plunger and a suction force is prevented from being created at the front portion of the plunger that would draw or suck water and/or clogging material into the interior of the plunger when the handle is pulled and extended from the plunger.

It is a further aspect and advantage of the present invention to provide a handle having a piston plate attached to one of its ends and a circular valve plate that slidingly fits within the inner portion of the piston plate wherein the valve plate is coupled to and controlled by a handle control mechanism wherein the handle control mechanism controls the valve plate in a closed position that covers and seals the perforated by-pass holes on the piston plate that allows air to be forced out of the front end of the plunger and wherein the handle control mechanism further controls the valve to be in an open position that allows air to flow in through the back end of the plunger so that water and/or clogging material is prevented from being drawn or sucked into the plunger.

It is a further aspect and advantage of the present invention to provide a handle that has attached to it a piston plate with a rotatingly engaging tab portion and a flexible valve flap with perforated by-pass holes and slidingly engaging tab portions attached to the piston plate and a cylindrical body of the plunger further having a top groove along its top inner wall to engage and allow semi-rotational movement of the rotatingly engaging tab portion and having side grooves along its inner side walls that engage and allow sliding movement of the slidingly engaging tab portions wherein the piston plate can be rotated to an offset and closed position so that the handle can be pushed towards the front portion of the plunger to compress and force air out of the plunger and wherein the piston plate can also be rotated to an aligned and open position so that the handle can be pulled or extended from the plunger to allow air to flow in through the back end of the plunger which prevents water and clogging material from being drawn or sucked into the plunger.

It is an object and advantage of the present invention to provide a method of making a new plunger that includes the steps of providing a cylindrical hollow body, slidingly attaching a handle within the cylindrical hollow body, attaching an outlet hose to the front end of the cylindrical body, attaching an outlet tip to the front end of the outlet hose, and attaching a valve or flap mechanism to the handle that is able to control the air flow within the hollow of the cylindrical body so that the user can readily push and pull the handle of the plunger.

It is an object and advantage of the present invention to provide a method of using the new plunger that includes the steps of inserting and allowing a front end of the plunger to remain in a stopped or clogged area until the stopped or clogged area is cleared, pushing the handle towards the front end of the plunger to force air out of the plunger and towards the stopped or clogged area, pulling the handle back and away from the front end of the plunger wherein water and/or clogging material is prevented from being drawn into the plunger and wherein the user is able to again push the handle and force more air towards the clogged or stopped area, and allowing the user to repeat the pushing and pulling of the handle as necessary until the stopped or clogged area is cleared.

It is another object and advantage of the present invention to provide a new plunger apparatus and corresponding methods of manufacture and use that would allow quick, easy, clean, cost-effective, environmentally safe, and readily repeatable air forcing action that is able to clear a clogged or stopped area.

BRIEF DESCRIPTION OF THE DRAWINGS

FIG. 20—Perspective view of the first preferred embodiment plunger being used to clear a clogged or stopped toilet.

FIG. 20A—Perspective sectional view of the first preferred embodiment plunger being used to clear a clogged or stopped sink.

FIG. 21—Perspective view of a second embodiment handle for a second embodiment plunger of the present invention wherein the handle comprises a handle control mechanism for the valve plate and the valve plate is shown in the closed position.

FIG. 22—Perspective view of the second embodiment handle for a second embodiment plunger of the present invention wherein the handle comprises a handle control mechanism for the valve plate and the valve plate is shown in the open position.

DETAILED DESCRIPTION OF THE PREFERRED EMBODIMENT

Figure 1:
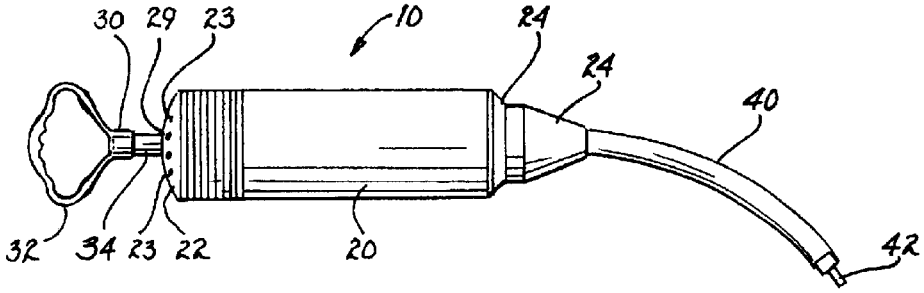
FIG. 1—Side view of a first preferred embodiment plunger of the present invention wherein the handle of the plunger is in an inserted position.
Figure 2:
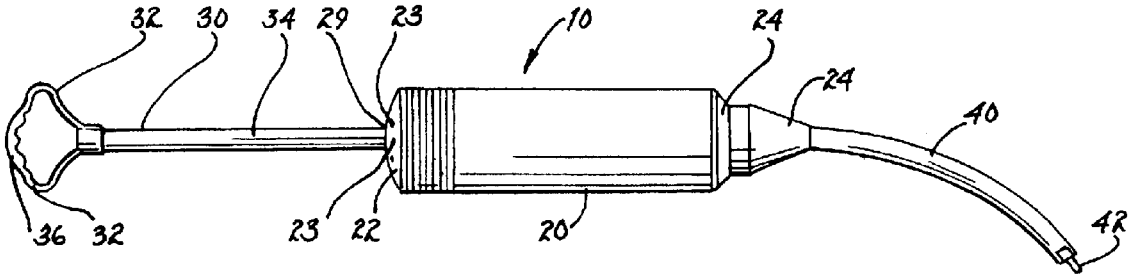
FIG. 2—Side view of the first preferred embodiment plunger wherein the handle of the plunger is in an extended position.
Figure 3:
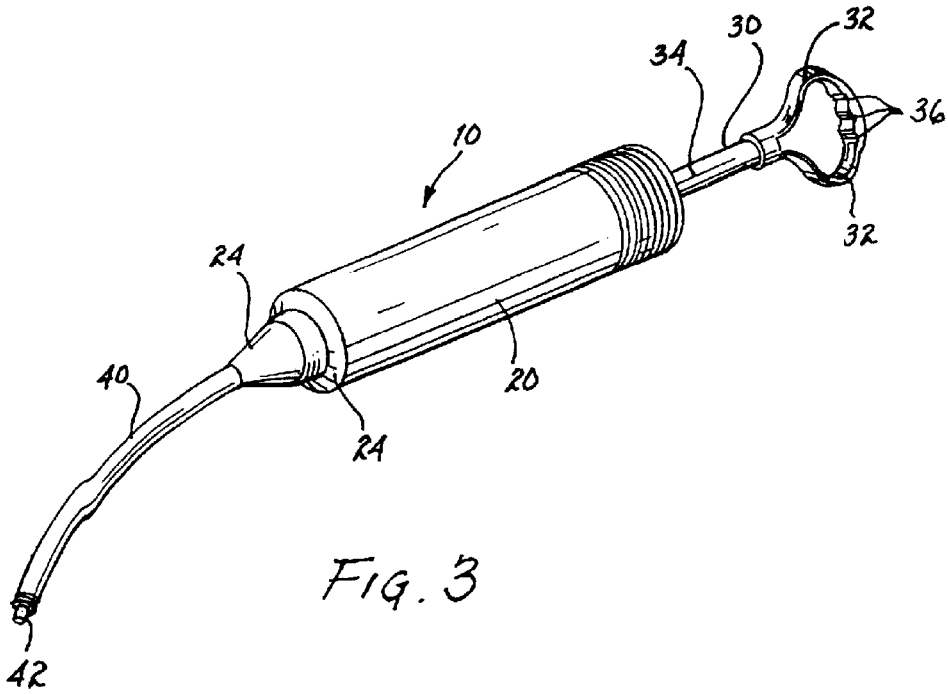
FIG. 3—Perspective view of the first preferred embodiment plunger.

[The present invention relates to a new plunger 10 and the corresponding methods of manufacture and use of the plunger 10. FIGS. 1–3 show side and perspective views of the new plunger 10. Plunger 10 can be made from plastic or any other suitable material. Plunger 10 generally has a cylindrical hollow body 20, a handle 30, an outlet hose 40, and an outlet tip 42. A front component 24 is attached to the front end of the cylindrical body 20. An end of the outlet hose 40 is attached to the narrower end of the front component 24, and the outlet tip 42 is attached to the other end of the outlet hose 40. The outlet hose 40 and outlet tip 42 are used to help direct forced air towards a clogged or stopped area. A back plate 22 with perforated by-pass holes 23 is attached to the back end of the cylindrical body 20. The handle 30 has a sliding rod 34 attached to a handle grip 32 with gripping portions 36. The sliding rod 34 of handle 30 is able to slidingly move through an opening 29 in back plate 22 and within the cylindrical body 20.] *The present invention relates to a new plunger 10 and the corresponding methods of manufacture and use of the plunger 10. FIGS. 1–3 show side and perspective views of the new plunger 10. Plunger 10 can be made from plastic or any other suitable material. Plunger 10 generally has a cylindrical hollow body 20, a handle 30, an outlet hose 40, and an outlet tip 42. A front component 24, which is narrower in diameter than the cylindrical body, is attached to the front end of the cylindrical body 20. An end of the outlet hose 40, which is narrower in diameter than the front component 24, is attached to the narrower end of the front component 24. The outlet tip 42, which is narrower in diameter than the outlet hose 40, is attached to the other end of the outlet hose 40. The outlet hose 40 is flexible and along with the outlet tip 42 are used to help direct forced air towards a clogged or stopped area. A back plate 22 with perforated by-pass holes 23 is attached to the back end of the cylindrical body 20. The handle 30 has a sliding rod 34 attached to a handle grip 32 with gripping portions 36. The sliding rod 34 of handle 30 is able to slidingly move through an opening 29 in back plate 22 and within the cylindrical body 20.*

Figure 4:
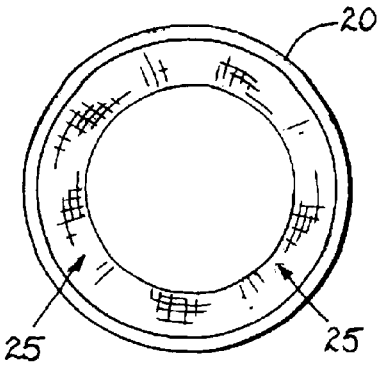
FIG. 4—Inner side view of the cylindrical hollow body of the first preferred embodiment plunger showing the interior of the cylindrical body.
Figure 5:
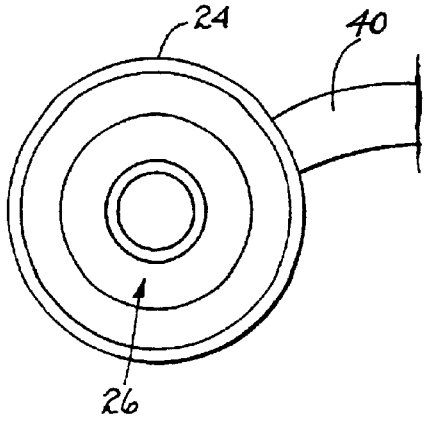
FIG. 5—Inner side view of the front component of the first preferred embodiment plunger that holds one end of an outlet hose.
Figure 6:
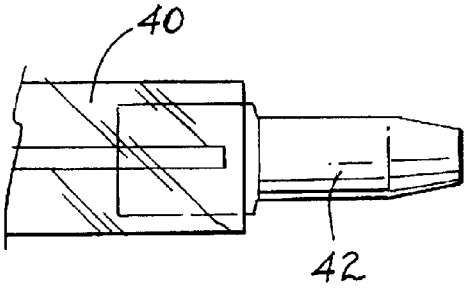
FIG. 6—Side view of a tip of the first preferred embodiment plunger that is attached to another end of the outlet hose.
Figure 7:
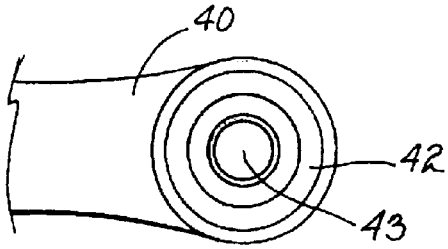
FIG. 7—Front view of the tip of the first preferred embodiment plunger that is shown in FIG. 6.
Figure 8:
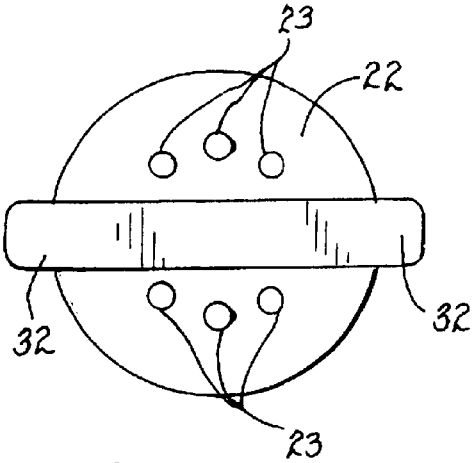
FIG. 8—Back view of the first preferred embodiment plunger.
Figure 9:
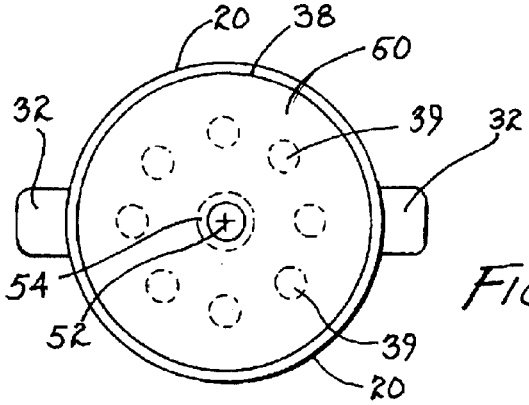
FIG. 9—Front view of the handle and attached flexible valve flap of the first preferred embodiment plunger.
Figure 10:
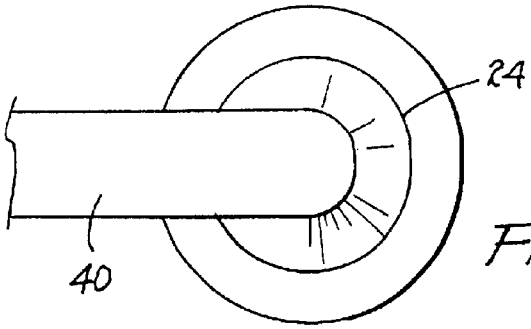
FIG. 10—Outside view of the front portion of the first preferred embodiment plunger.

The handle 30 is able to move within the interior of the cylindrical body 20. FIG. 1 shows handle 30 of plunger 10 in an inserted position within the cylindrical body 20, and FIG. 2 shows handle 30 of plunger 10 in an extended position from the cylindrical body 20. Cylindrical body 20 has a hollow interior 25 as shown in FIG. 4, and front component 24 has a narrowing hollow interior 26 which leads into the outlet hose 40 as shown in FIG. 5. The outlet tip 42 is attached to the front end of outlet hose 40 as shown in FIGS. 6 and 7. FIG. 8 shows a back view of the plunger 10, and the back of the plunger 10 comprises the handle grip 32 and a back plate 22 with perforated by-pass holes 23. FIG. 9 shows the front view of the handle 30 with handle grip 32 wherein the flexible valve flap 50 is shown attached to the piston plate 38, and the flexible valve flap 50 covers the perforated holes 39 in piston plate 38. FIG. 10 shows the general front portion of the plunger 20. The outlet tip 42 and front portion of outlet hose 40 are inserted or placed into a clogged or stopped area.

Figure 11:
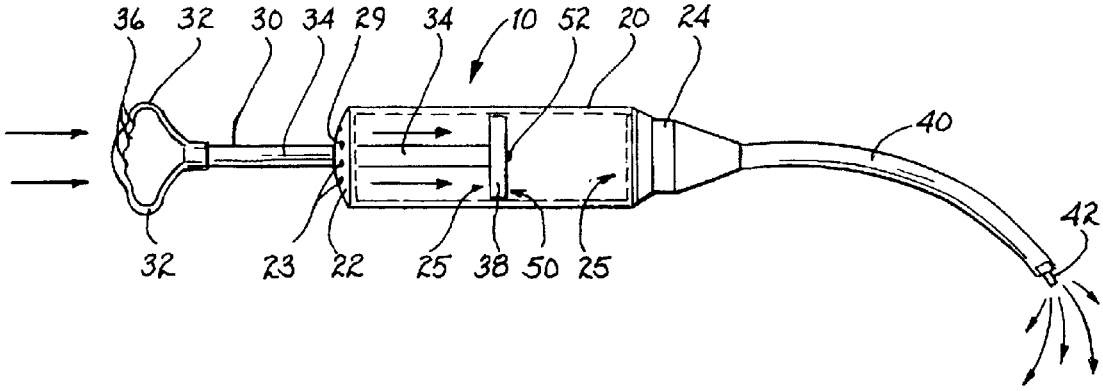
FIG. 11—Side view of the first preferred embodiment plunger showing the interior of the cylindrical body wherein the handle is being inserted into the cylindrical body and the flexible valve flap placed into a closed position that forces air through the outlet hose and out of the outlet tip.
Figure 12:
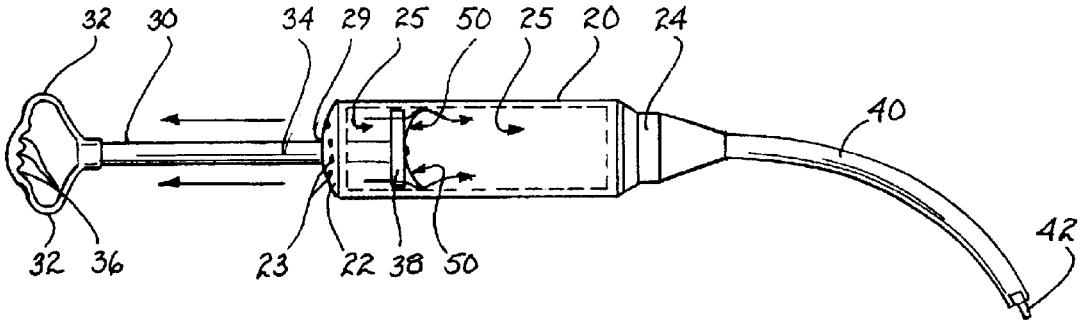
FIG. 12—Side view of the first preferred embodiment plunger showing the interior of the cylindrical body wherein the handle is being pulled out and extended from the cylindrical body and the flexible valve flap placed into an open position that allows air to flow in through the back end of the cylindrical body so that a suction force is not created at the front portion of the plunger.

FIGS. 11 and 12 show the general clearing or air forcing action of a first preferred embodiment of the new plunger 10. The new plunger 10 generally utilizes the general concept of a "one way" flexible valve flap 50. FIG. 11 shows the plunger 10 with handle 30 being pushed and inserted into the cylindrical body 20. The sliding rod 34 slides through the opening 29 of back plate 22, and the piston plate 38 with the attached flexible valve flap 50 moves towards the front portion of the plunger 10. The flexible valve flap 50 has a diameter that is equal or slightly larger than the diameter of inner hollow 25 of cylindrical body 20. As the piston plate 38 is pushed and moved towards the front portion of the plunger 10, the flap 50 compresses against the inner walls of the cylindrical body 20, and the flap 50 is automatically forced in a closed position against the piston plate 38 covering and sealing the perforated by-pass holes 39. The piston plate 38 and the closed position flap 50 compresses and forces air through hollow 25, front component 24, outlet hose 40, and out of outlet tip 42.

FIG. 12 shows the plunger 10 with handle 30 being pulled out and extended from the cylindrical body 20. The sliding rod 34 also slides through the opening 29 of back plate 22, and the piston plate 38 with the attached flexible valve flap 50 moves towards the back plate 22 of the cylindrical body 20. As the piston plate 38 is pulled and moved towards the back portion of the plunger 10, the flap 50 flexes outwardly and away from the piston plate 38, and the flap 50 is forced into an open position wherein the perforated by-pass holes 39 of the piston plate 38 are in an open position to allow air to flow through them. Air is then able to flow in through the holes 23 of the back plate 22 of the cylindrical body 20, through the back portion of the hollow 25 through the holes 39 of the piston plate 38, around the flap 50, and into the front portion of the hollow 25. Since the air flows into the front portion of the cylindrical body 20, a suction force is not created at the front portion of the plunger that would draw or suck water and/or clogging material (i.e. debris, particles, materials, feces, etc.) into the hollow 25 of cylindrical body 20. Since air is forced out of the plunger 10 only when the flap 50 is in the closed position, then flap 50 is considered a "one-way" valve flap in that it only allows air forcing action when the handle 30 is being pushed into the cylindrical body 20, and it does not allow any suction, plunging, clearing action, etc. to occur when the handle 30 is being pulled from the cylindrical body 20. The flap 50 can alternatively be any other type of valve or diaphragm that functions to control the air that flows out of the front end or the back end of the plunger 10.

Figure 13:
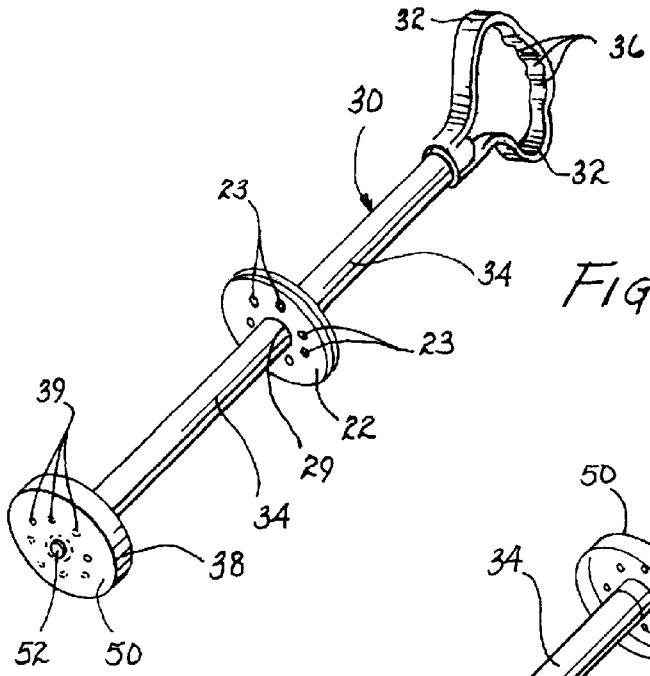
FIG. 13—Front perspective view of the handle with attached flexible valve flap, piston plate, and back plate of the first preferred embodiment plunger.
Figure 14:
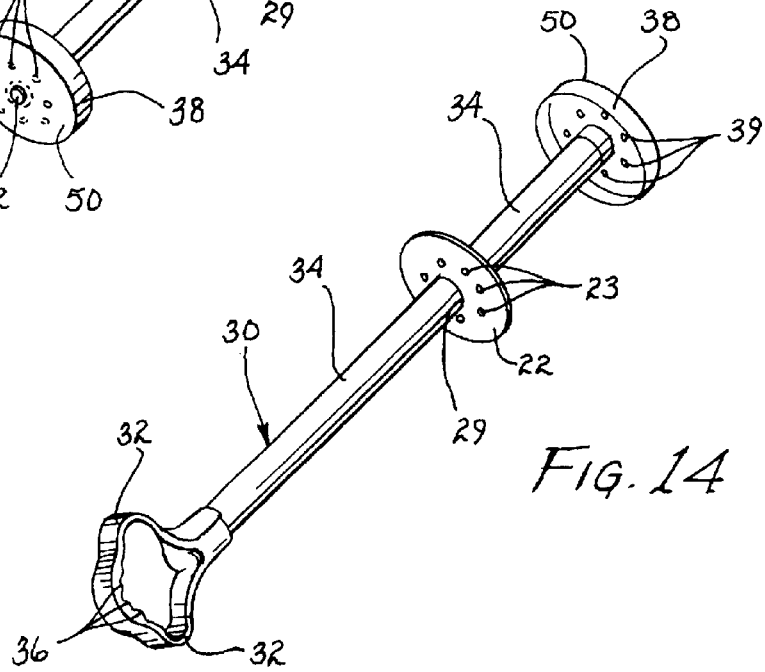
FIG. 14—Back perspective view of the handle with attached back plate, piston plate, and flexible valve flap of the first preferred embodiment plunger.
Figure 15:
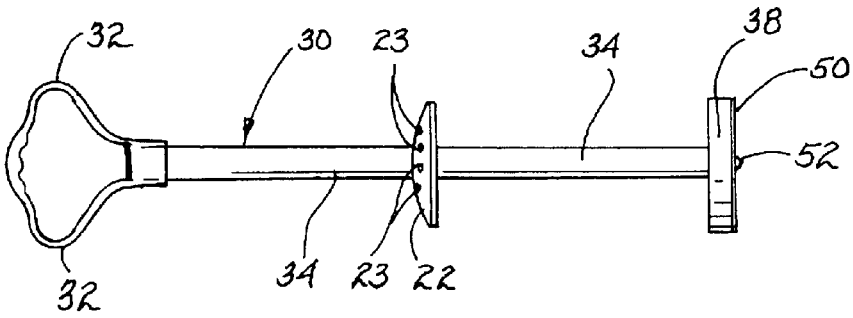
FIG. 15—Side view of the handle with attached back plate, piston plate, and flexible valve flap of the first preferred embodiment plunger.

FIGS. 13, 14, and 15 respectively show a front perspective view, a back perspective view, and a side view of the handle 30. In FIGS. 13, 14, and 15, handle 30 is shown with sliding rod 34 and attached handle grip 32 and gripping portions 36. The back plate 22 with perforated by-pass holes 23 is attached to the sliding rod 34 through hole 29 so that sliding rod 34 is able to slidingly move back and forth through hole 29. The piston plate 38 with perforated by-pass holes 39 is attached to the front portion of the handle 30. The flexible valve flap 50 is a bendable circular plastic plate.

Figure 16:
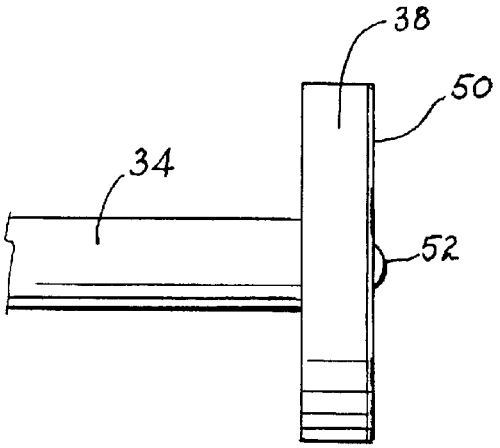
FIG. 16—Side sectional view of the front portion of the handle in FIG. 15 showing the attached piston plate and flexible valve flap in the closed position.
Figure 17:
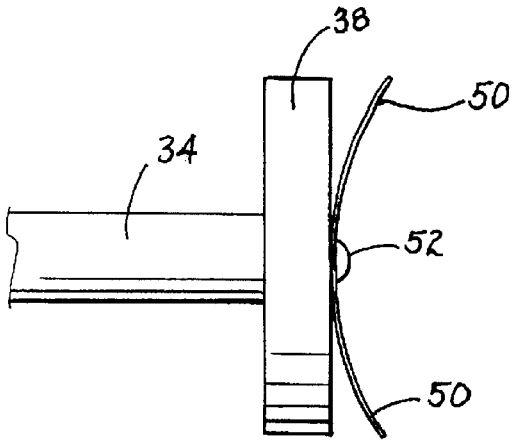
FIG. 17—Side sectional view of the front portion of the handle in FIG. 15 showing the attached piston plate and the flexible valve flap in an open position.
Figure 18:
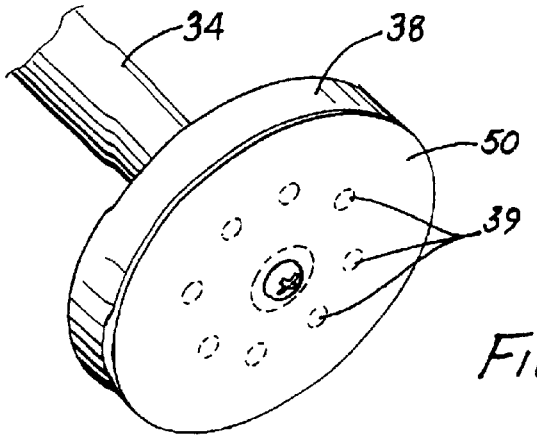
FIG. 18—Perspective sectional view of the front portion of the handle in FIG. 15 showing the attached piston plate and flexible valve flap in the closed position.
Figure 19:
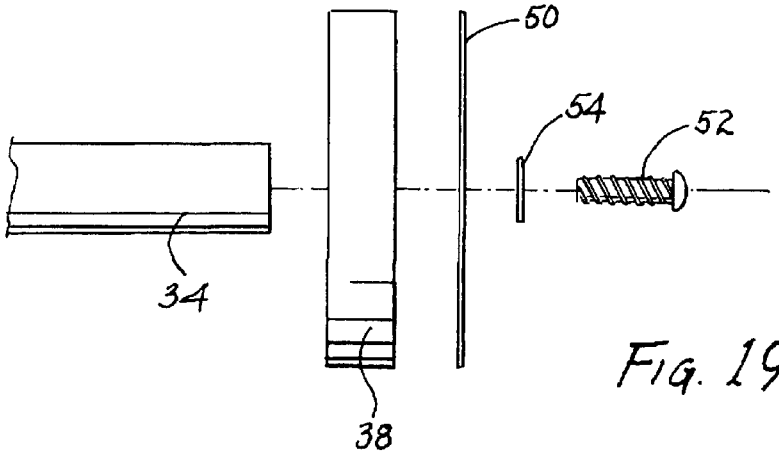
FIG. 19—Exploded view of the front portion of the handle in FIG. 15 showing the components that attach the flexible valve flap to the piston plate.

FIGS. 16–19 show various views of the flexible valve flap 50 attached to the piston plate 38 with perforated holes 39. As shown in FIGS. 16–19, the flap 50 is attached to the piston plate 38 by the use of screw 52 and washer 54 being mounted and threaded through the center of the flap 50 and piston plate 38. FIG. 16 shows that the flap 50 and piston plate 38 in the closed position, and FIG. 17 shows that the flap 50 flexes outwardly and away from piston plate 38 so that the flap 50 and piston plate 38 are in the open position.

FIG. 20 shows the first preferred embodiment plunger 10 being used to clear a clogged or stopped toilet 80 by inserting the front portion of the plunger 10 into the clogged or stopped area 82. FIG. 20A shows the first preferred embodiment plunger 10 being used to clear a clogged or stopped sink 90 by inserting the front portion of the plunger 10 into the clogged or stopped area 92. The plunger 10 clears the clogged or stopped area 82 or 92 by the user holding the plunger 10 at the clogged or stopped area 82 or 92. The user repeatedly pushes and pulls the handle 30. As described in FIGS. 11 and 12, air is forced and blasted out of tip 42 and to the stop or clog every time the handle 30 is being pushed by the user, and no suction force is created at tip 42 or the front portion of the plunger 10 when the handle 30 is pulled, extended, or retracted by the user. The air that is forced out of the tip 42 either immediately or eventually blasts an opening through the clog, and the clog or stop is immediately or eventually cleared by the water and clogging material continuing to flow and be forced through the opening. Therefore, the front portion of the plunger 10 can remain in the clogged or stopped area 82 or 92 at all times when the plunger 10 is being used, and the user does not have to remove the plunger 10 and does not have to worry about water or clogging material being sucked into the inner portion of the plunger 10.

FIGS. 21 and 22 show a second embodiment handle 30A for a second embodiment plunger. The second embodiment plunger (i.e. not shown) is virtually identical to first preferred embodiment plunger 10. The main difference between the second embodiment plunger and the first embodiment plunger 10 is the method of how the flexible valve flap or valve plate is controlled to the open and closed positions. FIGS. 21 and 22 show that the second embodiment handle 30A also has a sliding rod 34, a handle grip 32 attached to the back end of the sliding rod 34, and a piston plate 38 attached to the front end of the sliding rod 34.

Handle 30A, however, has a circular valve plate 60 (i.e. either flexible or rigid material). The diameter of the plate 60 is slightly smaller than the inner diameter of the piston plate 38, and the plate 60 slidingly fits within the inner portion of the piston plate 38 as shown in FIGS. 21 and 22. The plate 60 is attached to legs 62 that extend from the interior of sliding rod 34 through slots 35 (i.e. a leg 62 and a slot 35 are located on each side of the sliding rod 34 as shown in FIGS. 21 and 22). The legs 62 are attached to a handle control mechanism 64 that is located within the handle grip 32 via a retractable cable or rod 68. The ends of handle control mechanism 64 are slidingly mounted to the handle grip 32 at inner slots 66. The handle 30A is used within a cylindrical body 20 that is identical to plunger 10.

In FIG. 21, the handle control mechanism 64 is released, and the valve plate 60 is within the inner portion of the piston plate 38 and in the closed position covering and sealing the perforated by-pass holes 39 on piston plate 38. The handle control mechanism 64 is therefore released when the user is pushing the handle 30A towards the front portion of the first embodiment plunger which compresses and forces air out of the tip 42 (i.e. similar to FIG. 11). However, when the user needs to pull, extend, or retract the handle 30A from the cylindrical body 20, then the user will have to first grip or squeeze the handle control mechanism 64. The mechanism 64 will slide along the slots 66 towards the back of the handle grip 32, and the cable or rod 68 will retract the legs 62 to slide towards the back of the slots 35. In FIG. 22, the retraction of the cable or rod 68 results in the valve plate 60 sliding out of the inner portion of the piston plate 38 and to an open position which allows air to flow through the perforated holes 39. The air will be allowed to flow into the front portion of the cylindrical body 20 of the second embodiment plunger (i.e. similar to FIG. 12) which prevents water and clogging material from being sucked into the second embodiment plunger.

FIGS. 23–27 show components for a third embodiment plunger. The third embodiment plunger (i.e. not shown) is also identical to first preferred embodiment 10. Third embodiment plunger, however, is different from plunger 10 in that it has a third embodiment cylindrical body 20B and a third embodiment handle 30B, and the main difference between third embodiment plunger and plunger 10 is the method of how the flexible valve flap or valve plate is controlled to the open and closed positions.

Figure 23:
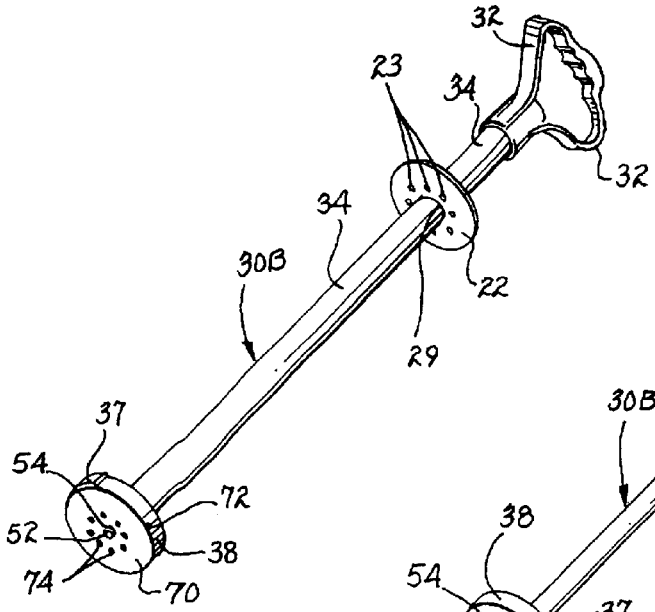
FIG. 23—Perspective view of a third embodiment handle for a third embodiment plunger of the present invention wherein the handle comprises a rotatable control mechanism that shows the flexible valve flap in a closed position.
Figure 24:
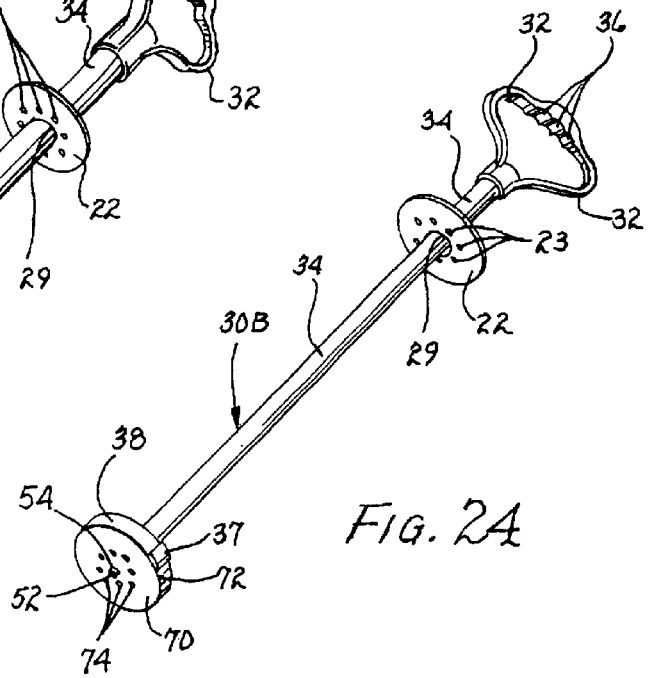
FIG. 24—Perspective view of the third embodiment handle for a third embodiment plunger of the present invention wherein the handle comprises a rotatable control mechanism that shows the flexible valve flap in an open position.
Figure 25:
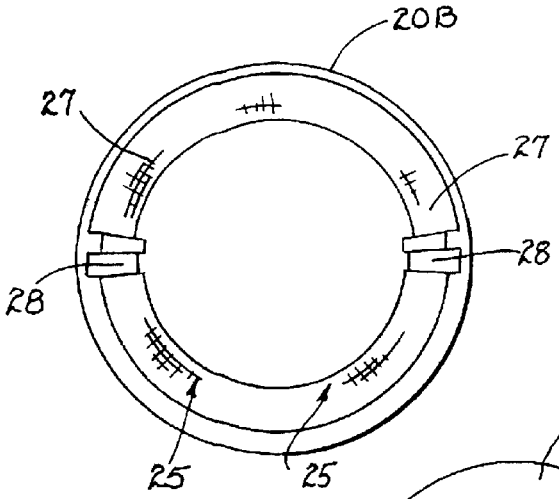
FIG. 25—Inner side view of the cylindrical hollow body of the third embodiment plunger showing the top and side grooves that respectively engage and allow movement of the tab portions of the piston plate and the flexible valve flap.
Figure 26:
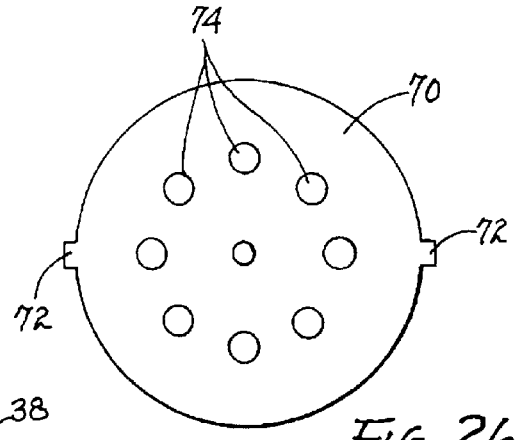
FIG. 26—Front view of the flexible valve flap of the third embodiment plunger showing the attached tab portions that engage the side grooves within the hollow of the cylindrical body.
Figure 27:
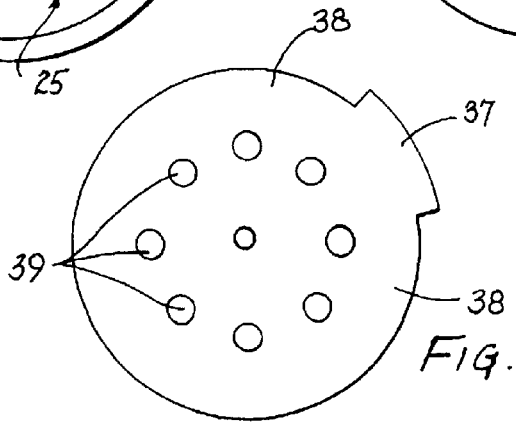
FIG. 27—Front view of the front plate of the third embodiment plunger showing the attached tab portions that engage the top groove within the hollow of the cylindrical body.

FIGS. 23 and 24 show that the handle 30B has a sliding rod 34, a handle grip 32 attached to the back end of the sliding rod 34, and a piston plate 38 integrally attached to the front end of the sliding rod 34. A flexible valve flap 70 is attached in front of the piston plate 38 by the use of the screw 52 and washer 54. The flap 70 for the third embodiment plunger, however, differs from the flap 50 for plunger 10 in that the flap 70 further has perforated bypass holes 74 and tab portions 72 as shown in FIG. 26. FIG. 27 further shows that piston plate 38 has a tab portion 37. FIG. 25 shows the interior view of the cylindrical hollow body 20B. Cylindrical body 20B has an additional top groove 27 along its top inner wall which engages and allows semi-rotational movement (i.e. within the limited range of the arc of the groove 27) of the tab portion 37 of piston plate 38. Furthermore, cylindrical body 20B has additional side grooves 28 along its inner side walls that engage and allow sliding movement of the tab portions 72 of flexible valve flap 70. Therefore, when the handle 30B is mounted within the cylindrical body 20B, the tab portion 37 of piston plate 38 is fitted into the top groove 27 and the tab portions 72 of flap 70 are fitted and engaged into the grooves 28 of the cylindrical hollow body 20B.

From the perspective of the user, the handle 30B and piston plate 38 are rotated in a clockwise position (i.e. to the right) (Refer to FIG. 23). In FIG. 23, the tab portion 37 and the piston plate 38 are rotated to its shown position, and the tab portions 72 that engage the side grooves 28 prevent the flap 70 from any rotational movement (i.e. the flap 70, however, can still slidingly move within the cylindrical body 20B). The perforated holes 74 of the flap 70 and the perforated holes 39 of the piston plate 38 are placed into an offset and closed position. Therefore, the user rotates the handle 30B to the clockwise position to close the holes 74 of flap 70, and the user is then able to push the handle 30B towards the front portion of the third embodiment plunger to compress and force air out of outlet tip 42 (i.e. similar to FIG. 11). However, when the user needs to pull, extend, or retract the handle 30B from the cylindrical body 20B, then the user will have to first rotate the handle to a counter-clockwise position (i.e. to the left) from the perspective of the user (Refer to FIG. 24). The piston plate 38 and tab portion 37 are moved to the position as shown in FIG. 24, and the perforated holes 74 of the flap 70 and the perforated holes 39 of the piston plate 38 are in an aligned and open position. The user will be able to pull and extend the handle 30B from the cylindrical body 20B, and the air will be allowed to flow into the front portion of the cylindrical body 20B of the third embodiment plunger (i.e. similar to FIG. 12) which prevents water and clogging material from being sucked into the third embodiment plunger.

Therefore, new plunger invention of the present application provides a quick, easy, clean, and cost-effective plunger that is readily repeatable in its air forcing action to clear a clogged or stopped area.

The foregoing description of a preferred embodiment and best mode of the invention known to applicant at the time of filing the application has been presented for the purposes of illustration and description. It is not intended to be exhaustive or to limit the invention to the precise form disclosed, and obviously many modifications and variations are possible in the light of the above teaching. The embodiment was chosen and described in order to best explain the principles of the invention and its practical application to thereby enable other skilled in the art to best utilize the invention in various embodiments and with various modifications as are suited to the particular use contemplated.

What is claimed is:

1. A new plunger device for clearing clogs or stops in a drain or pipe comprising:

a hollow body having an outlet end and a back air-flow end, a handle that is inserted into the hollow body wherein the handle has a holding end for allowing a user to grip and an air-action end which slidingly moves in an interior of the hollow body between the outlet end and the back air-flow end of the hollow body, a piston plate attached to the air action end of the handle wherein the piston plate has air flow holes, a flexible valve flap attached to the piston plate wherein a perimeter edge of the flap flexes to a contacting sealing closed position with inner walls of the interior of the hollow body and the piston plate to cover and seal the airflow holes when the handle and the piston plate are being directed towards the outlet end of the hollow body to force and outwardly direct airflow to the outlet end to clear the clogs or stops and wherein the perimeter edge of the flap flexes away from the piston plate to a flexing open position relative to the inner walls providing at least one air passage therearound when the handle and the piston plate are being directed towards the back airflow end of the hollow body to prevent clogging materials or fluids from being drawn at the outlet end, and an outlet component attached to the outlet end of the hollow body through which air flow is outwardly directed.

2. The new plunger device according to claim 1 further comprising:

a handle control mechanism coupled to the handle and the valve mechanism for allowing a user to control the closed position and the open position of the valve mechanism.

3. The new plunger device according to claim 2 wherein the valve mechanism further comprises[:

a piston plate having air-flow holes wherein the piston plate is attached to the air-action end of the handle, and]

a valve plate coupled to and controlled by the handle control mechanism wherein the valve plate is slidingly fitted within an inner portion of the piston plate and wherein the handle control mechanism controls the valve plate in a closed position against the piston plate covering and sealing the air-flow holes of the piston plate and further controls the valve plate in an open position away from the piston plate opening the air-flow holes of the piston plate.

4. The new plunger device according to claim 1 wherein the outlet component further comprises:

a narrowing component attached to the outlet end of the hollow body for narrowing the air flow to the outlet end, an outlet hose attached to a narrower side of the narrowing component, and an outlet tip attached to the outlet hose for outwardly directing the air flow to the outlet end.

5. The new plunger device according to claim 1 wherein the hollow body further comprises:

a back plate attached to the back air-flow end of the hollow body and wherein the back plate has vent holes through which the air flow is directed when the handle and the valve mechanism are being directed towards the back air-flow end of the hollow body.

6. A method of using a new plunger device for clearing a clog or stop in a drain or pipe comprising the steps of:

providing a new plunger that comprises a hollow body having an outlet end and a back air-flow end, a handle having a holding end for allowing a user to grip and an air-action end which slidingly moves in an interior of the hollow body between the outlet end and the back air-flow end of the hollow body, a piston plate attached to the air action end of the handle wherein the piston plate has airflow holes, a flexible valve flap attached to the piston plate wherein a perimeter edge of the flap flexes to a contacting sealing closed position with inner walls of the interior of the hollow body and the piston plate to cover and seal the airflow holes when the handle and the piston plate are being directed towards the outlet end of the hollow body to force and outwardly direct airflow to the outlet end to clear the clogs or stops and wherein the perimeter edge of the flap flexes away from the piston plate to a flexing open position relative to the inner walls providing at least one air passage therearound when the handle and the piston plate are being directed towards the back airflow end of the hollow body to prevent clogging materials or fluids from being drawn at the outlet end, and an outlet component attached to the outlet end of the hollow body through which the air flow is outwardly directed, inserting the outlet component near the clog or stop, moving the handle towards the outlet end to outwardly direct air flow through the outlet component, and moving the handle towards the back air-flow end to outwardly direct air flow to the back air-flow end to prevent clogging materials or fluids from being drawn at the outlet end.

7. The method of using a new plunger device according to claim 6 wherein the providing step further comprises the step of:

coupling a handle control mechanism to the handle and the valve mechanism for allowing a user to control the closed position and the open position of the valve mechanism.

8. The method of using a new plunger device according to claim 7:

wherein the providing step further comprises the step of:

providing the valve mechanism with a piston plate having air-flow holes attached to the air-action end of the handle, and coupling a valve plate to the handle control mechanism in which the valve plate is slidingly fitted within an inner portion of the piston plate, and wherein the moving the handle towards the outlet end step further comprises the step of allowing the handle control mechanism to control the valve plate in a closed position against the piston plate by first releasing the handle control mechanism so that the air flow holes of the piston plate are covered and sealed, and wherein the moving the handle towards the back air-flow end step further comprises the step of allowing the handle control mechanism to control the valve plate in an open position away from the piston plate by first applying pressure to the handle control mechanism so that the air flow holes of the piston plate are open.

9. A method of making a new plunger device for clearing clogs or stops in a drain or pipe comprising the steps of:

providing a hollow body having an outlet end and a back air-flow end, inserting a handle into the hollow body wherein the handle has a holding end for allowing a user to grip and an air-action end which slidingly moves in an interior of the hollow body between the outlet end and the back air-flow end of the hollow body, attaching a piston plate to the air action end of the handle wherein the piston plate has airflow holes, attaching a flexible valve flap to the piston plate wherein a perimeter edge of the flap flexes to a contacting sealing closed position with inner walls of the interior of the hollow body and the piston plate to cover and seal the airflow holes when the handle and the piston plate are being directed towards the outlet end of the hollow body to force and outwardly direct airflow to the outlet end to clear the clogs or stops and wherein the perimeter edge of the flap flexes away from the piston plate to a flexing open position relative to the inner walls providing at least one air passage therearound when the handle and the piston plate are being directed towards the back airflow end of the hollow body to prevent clogging materials or fluids from being drawn at the outlet end, and attaching an outlet component to the outlet end of the hollow body through which air flow is outwardly directed.

10. The method of making a new plunger device according to claim 9 further comprising the step of:

coupling a handle control mechanism to the handle and the valve mechanism for allowing a user to control the closed position and the open position of the valve mechanism.

11. The method of making a new plunger device according to claim 10 wherein the attaching a valve mechanism step further comprises the steps of:

attaching a piston plate having air-flow holes to the air-action end of the handle, and coupling a valve plate to the handle control mechanism wherein the valve plate is slidingly fitted within an inner portion of the piston plate and wherein the handle control mechanism controls the valve plate in a closed position against the piston plate covering and sealing the air-flow holes of the piston plate and further controls the valve plate in an open position away from the piston plate opening the air-flow holes of the piston plate.

12. The method of making a new plunger device according to claim 9 wherein the attaching an outlet component step further comprises the steps of:

attaching a narrowing component to the outlet end of the hollow body for narrowing the air flow to the outlet end, attaching an outlet hose to a narrower side of the narrowing component, and attaching an outlet tip to the outlet hose for outwardly directing air flow to the outlet end.

13. A new plunger device for clearing clogs or stops in a drain or pipe comprising:

a hollow body having an outlet end and a back air-flow end, a handle that is inserted into the hollow body wherein the handle has a holding end for allowing a user to grip and an air-action end which slidingly moves in an interior of the hollow body between the outlet end and the back air-flow end of the hollow body, a valve mechanism attached to the air-action end that slides within the interior of the hollow body and generally moves with the air-action end of the handle between the outlet end and the back air-flow end and wherein the valve mechanism has a closed position for forcing and outwardly directing air flow to the outlet end to clear the clogs or stops and has an open position for allowing and outwardly directing the air flow to the back air-flow end to prevent clogging materials or fluids from being drawn at the outlet end, an outlet component attached to the outlet end of the hollow body through which air flow is outwardly directed, and a handle control mechanism coupled to the handle and the valve mechanism for allowing a user to control the closed position and the open position of the valve mechanism wherein the handle control mechanism further comprises a coupling cable or rod that generally extends a length of the handle, a handle controller attached at one end of the coupling cable or rod near the holding end of the handle, and at least one attachment leg coupled to the valve mechanism and attached at another end of the coupling cable or rod near the air-action end of the handle and wherein the handle further comprises slots in which at least a portion of the handle controller slides and slots in which at least a portion of the at least one attachment leg slides.

14. A new plunger device for clearing clogs or stops in a drain or pipe comprising:

a hollow body having an outlet end and a back air-flow end, a handle that is inserted into the hollow body wherein the handle has a holding end for allowing a user to grip and an air-action end which slidingly moves in an interior of the hollow body between the outlet end and the back air-flow end of the hollow body, a valve mechanism attached to the air-action end that slides within the interior of the hollow body and generally moves with the air-action end of the handle between the outlet end and the back air-flow end and wherein the valve mechanism has a closed position for forcing and outwardly directing air flow to the outlet end to clear the clogs or stops and has an open position for allowing and outwardly directing the air flow to the back air-flow end to prevent clogging materials or fluids from being drawn at the outlet end wherein the valve mechanism further comprises a piston plate having aligning air-flow holes wherein the piston plate is attached to the air-action end of the handle and a valve plate having air-flow holes wherein the valve plate is coupled to and controlled by the handle and wherein the piston plate rotates relative to the valve plate when the handle is rotated so that the aligning air flow holes of the piston plate are offset with the air flow holes of the valve plate when the valve mechanism is in the closed position and the aligning air flow holes of the piston plate are aligned with the air flow holes of the valve plate when the valve mechanism is in the open position, an outlet component attached to the outlet end of the hollow body through which air flow is outwardly directed, and a handle control mechanism coupled to the handle and the valve mechanism for allowing a user to control the closed position and the open position of the valve mechanism.

15. The new plunger device according to claim 14:

wherein the hollow body further comprises:

an inner piston plate groove for engaging and allowing at least partial rotational movement of the piston plate within the hollow body, and at least two inner valve plate grooves for engaging and allowing sliding movement of the valve plate within the hollow body, and wherein the piston plate further comprises a rotatingly engaging tab portion that correspondingly engages and rotates within the inner plate groove, and wherein the valve plate further comprises at least two slidingly engaging tab portions that correspondingly engage and slide within the at least two inner valve plate grooves.

16. A method of using a new plunger device for clearing a clog or stop in a drain or pipe comprising the steps of:

providing a new plunger that comprises a hollow body having an outlet end and a back air-flow end, a handle having a holding end for allowing a user to grip and an air-action end which slidingly moves in an interior of the hollow body between the outlet end and the back air-flow end of the hollow body, a valve mechanism attached to the air-action end of the handle that slides within the interior of the hollow body and generally moves with the air-action end of the handle between the outlet end and the back air-flow end and wherein the valve mechanism has a closed position for forcing and outwardly directing air flow to the outlet end to clear the clogs or stops and has an open position for allowing and outwardly directing the air flow to the back air-flow end to prevent clogging materials or fluids from being drawn at the outlet end, an outlet component attached to the outlet end of the hollow body through which the air flow is outwardly directed, a handle control mechanism coupled to the handle and the valve mechanism for allowing a user to control the closed position and the open position of the valve mechanism, inserting the outlet component near the clog or stop, moving the handle towards the outlet end to outwardly direct air flow through the outlet component, and moving the handle towards the back air-flow end to outwardly direct air flow to the back air-flow end to prevent clogging materials or fluids from being drawn at the outlet end, wherein the providing step further comprises the step of:

providing the valve mechanism with a piston plate having aligning air-flow holes attached to the air-action end of the handle, and coupling a valve plate having air-flow holes to the handle, and wherein the moving the handle towards the outlet end step further comprises the steps of:

rotating the piston plate relative to the valve plate by rotating the handle, and offsetting the air flow holes of the piston plate and the valve plate so that the piston plate and the valve plate are in the closed position, and wherein the moving the handle towards the back air-flow end step further comprises the steps of rotating the piston plate relative to the valve plate by rotating the handle, and aligning the air flow holes of the piston plate and the valve plate so that the piston-plate and the valve plate are in the open position.

17. A method of making a new plunger device for clearing clogs or stops in a drain or pipe comprising the steps of:

providing a hollow body having an outlet end and a back air-flow end, inserting a handle into the hollow body wherein the handle has a holding end for allowing a user to grip and an air-action end which slidingly moves in an interior of the hollow body between the outlet end and the back air-flow end of the hollow body, attaching a valve mechanism to the air-action end which slides within the interior of the hollow body that generally moves with the air-action end of the handle between the outlet end and the back air-flow end and wherein the valve mechanism has a closed position for forcing and outwardly directing air flow to the outlet end to clear the clogs or stops and has an open position for allowing and outwardly directing the air flow to the back air-flow end to prevent clogging materials or fluids from being drawn at the outlet end, wherein the attaching a valve mechanism step further comprises attaching a piston plate having aligning air-flow holes to the air-action end of the handle and coupling a valve plate having air-flow holes to the handle and wherein the piston plate rotates relative to the valve plate when the handle is rotated so that the aligning air flow holes of the piston plate are offset with the air flow holes of the valve plate when the valve mechanism is in the closed position and the aligning air flow holes of the piston plate are aligned with the air flow holes of the valve plate when the valve mechanism is in the open position, attaching an outlet component to the outlet end of the hollow body through which air flow is outwardly directed, and coupling a handle control mechanism to the handle and the valve mechanism for allowing a user to control the closed position and the open position of the valve mechanism.

* * * * *